US011756184B2

(12) United States Patent
Forkuo (10) Patent No.: US 11,756,184 B2
(45) Date of Patent: Sep. 12, 2023

(54) CAPTURING VEHICLE DATA AND ASSESSING VEHICLE DAMAGE

(71) Applicant: CRASH POINT SYSTEMS, LLC, Worcester, MA (US)

(72) Inventor: Justin E. Forkuo, Worcester, MA (US)

(73) Assignee: CRASH POINT SYSTEMS, LLC, Worcester, MA (US)

( * ) Notice: Subject to any disclaimer, the term of this patent is extended or adjusted under 35 U.S.C. 154(b) by 439 days.

(21) Appl. No.: 16/936,388

(22) Filed: Jul. 22, 2020

(65) Prior Publication Data
US 2022/0028045 A1    Jan. 27, 2022

(51) Int. Cl.
*G06T 7/00* (2017.01)
*G07C 5/08* (2006.01)
*G07C 5/00* (2006.01)

(52) U.S. Cl.
CPC ............ *G06T 7/001* (2013.01); *G06T 7/0006* (2013.01); *G07C 5/008* (2013.01); *G07C 5/0808* (2013.01)

(58) Field of Classification Search
CPC .......... G06T 7/001; G06T 7/0006; G06T 2207/30136; G07C 5/008; G07C 5/0808
See application file for complete search history.

(56) References Cited

U.S. PATENT DOCUMENTS

| 10,636,148 B1* | 4/2020 | Chen ................. G06T 7/194 |
| 10,699,404 B1* | 6/2020 | Nussbaum .......... G06T 7/001 |
| 2017/0293894 A1* | 10/2017 | Taliwal ............. G06V 10/82 |
| 2018/0260793 A1* | 9/2018 | Li ..................... G06N 7/005 |

* cited by examiner

*Primary Examiner* — Sizo B Vilakazi (57) ABSTRACT

One example method of operation may include capturing vehicle image data and autonomously identifying vehicle damage. The method may include receiving captured data identifying a vehicle body, comparing the captured data to vehicle overlay data for difference data, determining whether the difference data identified is beyond one or more difference thresholds, and designating one or more vehicle portions as damaged when the difference data identified is beyond the threshold.

18 Claims, 9 Drawing Sheets

VEHICLE IMAGE DATA 210

VEHICLE OVERLAY DATA 212

VEHICLE OVERLAY & VEHICLE IMAGE DATA 214

CAPTURING VEHICLE DATA AND ASSESSING VEHICLE DAMAGE

TECHNICAL FIELD OF THE APPLICATION

This application relates to data processing, and more particularly, to capturing vehicle data and for assessing vehicle damage.

BACKGROUND OF THE APPLICATION

Conventionally, transports, such as automotive vehicles (e.g., cars, trucks, etc.), must undergo a human review process when accidents occur and the vehicle is brought into a repair assessment facility. For example, a collision on a roadway may cause damage to the vehicle body which is usually identified by a person walking around the vehicle, taking pictures, identifying the locations of the damage, etc., and taking notes on a template. The damage may be on the top, side, bottom, interior, etc., of the vehicle. The amount of time, expertise and other resources used to identify the vehicle damage may require significant costs to the damage management entities.

Certain efforts have been made to capture images of the vehicle via a 'drive-through' facility composed of a garage tunnel with multiple cameras angled in different positions. The cameras may produce images which can be combined into a single data report, however, the need for human analysis of the damage is still required at each step of this process. A fully-autonomous approach to capturing vehicle image data and identifying damage without human interaction would provide an optimal vehicle repair process.

SUMMARY OF THE APPLICATION

Example embodiments of the present application provide at least a method that includes one or more of capturing image data and identifying vehicle damage. The method may include receiving captured data identifying a vehicle body, comparing the captured data to vehicle overlay data for difference data, determining whether the difference data identified is beyond one or more difference thresholds, and designating one or more vehicle portions as damaged when the difference data identified is beyond the threshold.

Another example embodiment may include an apparatus with a receiver configured to receive captured data identifying a vehicle body, and a processor configured to compare the captured data to vehicle overlay data for difference data, determine whether the difference data identified is beyond one or more difference thresholds, and designate one or more vehicle portions as damaged when the difference data identified is beyond the threshold.

Another example embodiment may provide a non-transitory computer readable storage medium configured to store instructions that when executed cause a processor to perform receiving captured data identifying a vehicle body, comparing the captured data to vehicle overlay data for difference data, determining whether the difference data identified is beyond one or more difference thresholds, and designating one or more vehicle portions as damaged when the difference data identified is beyond the threshold.

DETAILED DESCRIPTION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in one or more embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide for methods, processes, devices, systems and non-transitory computer readable mediums which execute instructions to provide an data analysis procedure that includes receiving image data or other types of data from various data capturing devices, and comparing the data to known object characteristic data, such as sizes, lengths, widths, dimensions, etc., (manufacturer and/or specification data). In general, the data captured may be image data and may produce distances which begin and end at contrast lines, such as gaps between doors, fenders, hoods, trunks, wheels, etc., and anywhere a vehicle body panel begins and ends, and which can be readily identified by the image processing conducted by a computing platform. As a result, the portions of a vehicle body which are identified as having conflicting measurements when the captured image data is compared to known object characteristic data (i.e., manufacturer data), are then identified as damaged and can be summarized in a report for ease of implementation when ordering any needed replacement parts and when confirming reputable reports which seek to eliminate fraud.

Figure 1:
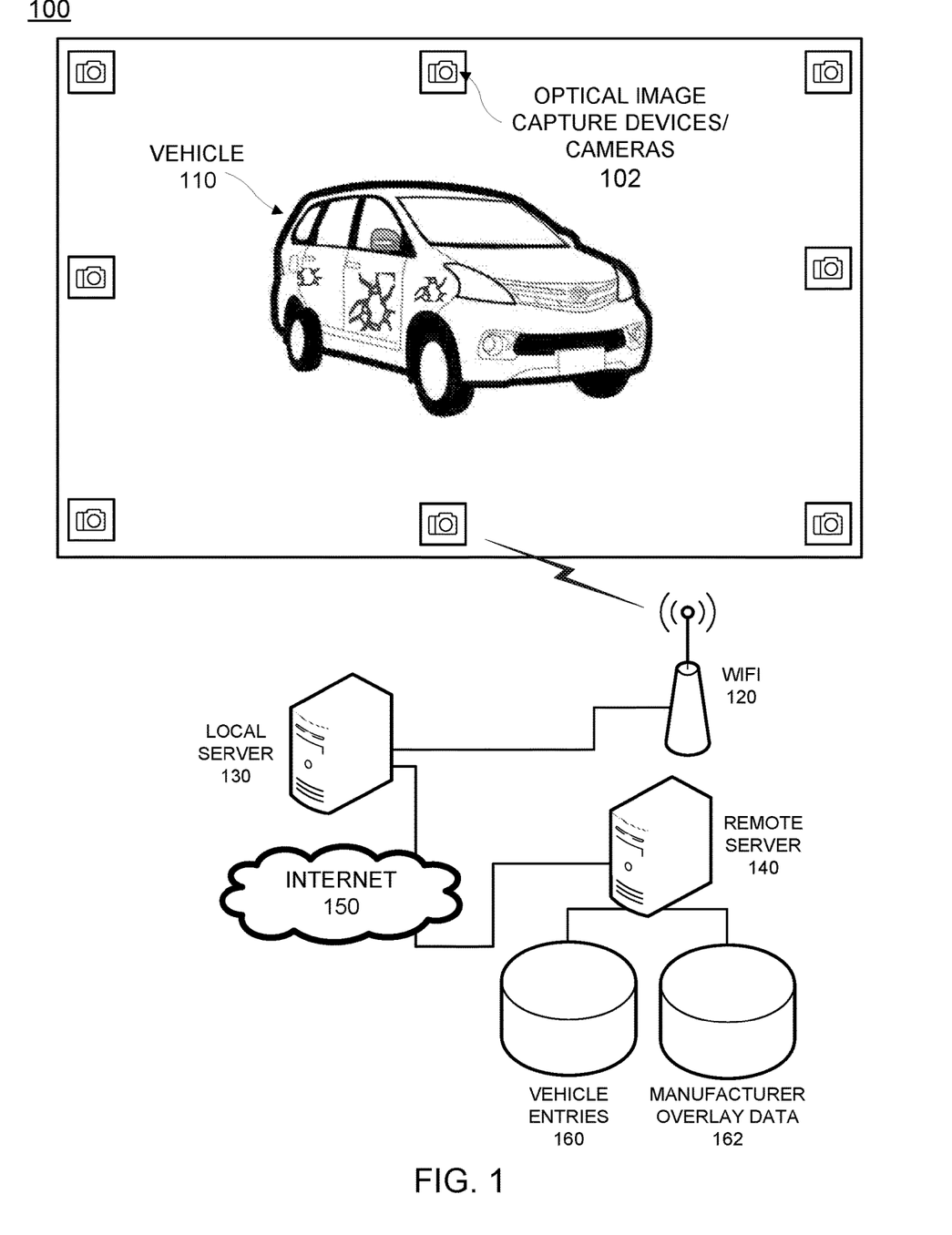
FIG. 1 illustrates an example network configuration for capturing vehicle images and processing the image data on a corresponding computing platform according to example embodiments.

FIG. 1 illustrates an example network configuration 100 for capturing vehicle images and processing the image data on a corresponding computing platform according to example embodiments. Referring to FIG. 1, the vehicle 110 may be any vehicle which is moved into an environment with a set of image capturing devices 102, which may also capture optical scans, infrared scans or other signal information which is captured and stored for future reference purposes, such as a comparison to known manufacturer specification data. The term specification or object data may include, but is not limited to, known contour angles, lengths, widths, depths, etc., with respect to known vehicle body segments.

The image data captured by the various cameras and/or optical image capturing devices 102 may include angles such as front, side, top, bottom, rear and corners of the vehicle. The image data may be forwarded via a wired connection medium and/or a wireless communication medium to a data processing and computing platform, such as local server 130 as a computing device with a communication interface, such as a WIFI communication medium station 120. The data may be stored locally as part of a case file of images and related data for a particular vehicle 110. The image data may be uploaded via a network 150 to a remote processing server 140 which may store case profiles for each vehicle/customer etc. in a databank of vehicle entries 160, and manufacturer overlay data identifying the vehicle data in another databank 162.

Figure 2A:
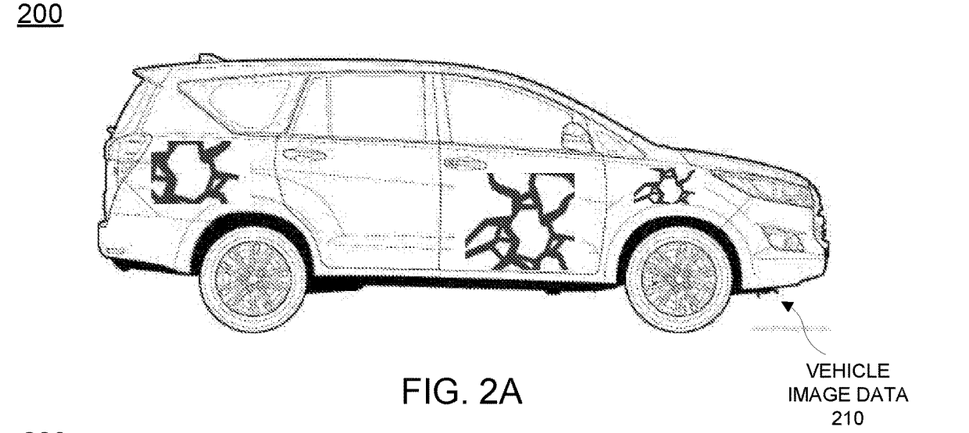
FIGS. 2A-2C illustrate a vehicle image being combined with vehicle overlay data to identify vehicle damage according to example embodiments.
Figure 2B:
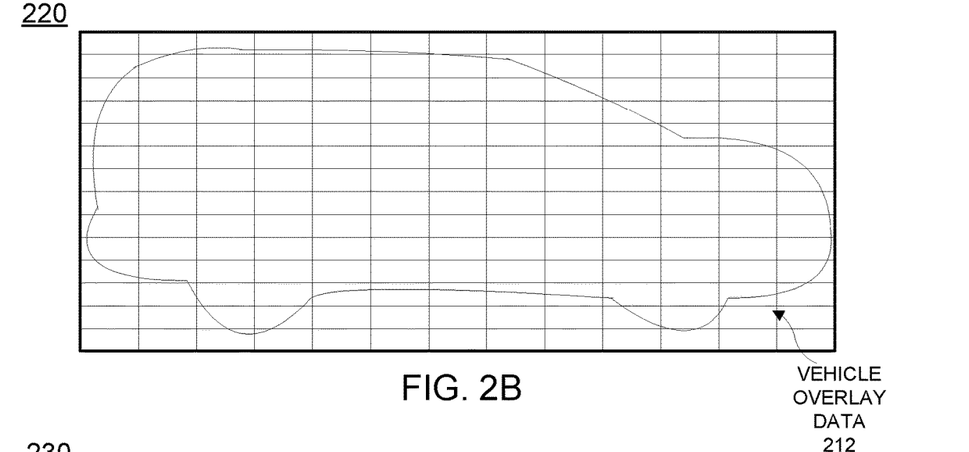
Figure 2C:
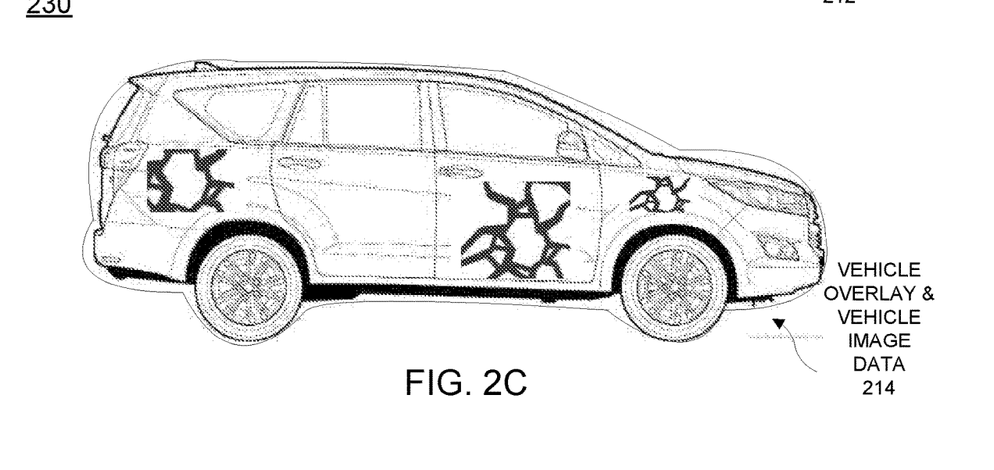

FIGS. 2A-2C illustrate a vehicle image being combined with a vehicle overlay to identify vehicle damage according to example embodiments. Beginning with FIG. 2A, the example illustration 200 provides a side view of the vehicle image 210, which may be an image that was capture by a camera and in this example demonstrates damage to the front passenger side fender, the passenger front door and the rear passenger side fender, at a minimum. The overlay configuration 220 of FIG. 2B may be a closely form-fitted rendition 212 of the vehicle which is based on manufacturing data that defines distances, such as diagonals, horizontal, vertical, etc., for each vehicle panel, such as doors, fenders, height, wheel base, wheel distance from frame, etc. The visualization 230 of FIG. 2C may appear in a user device operated graphical user interface that is displayed to a user utilizing the automated vehicle damage analysis with the data overlay 214 to assist with damage area identification.

Figure 2D:
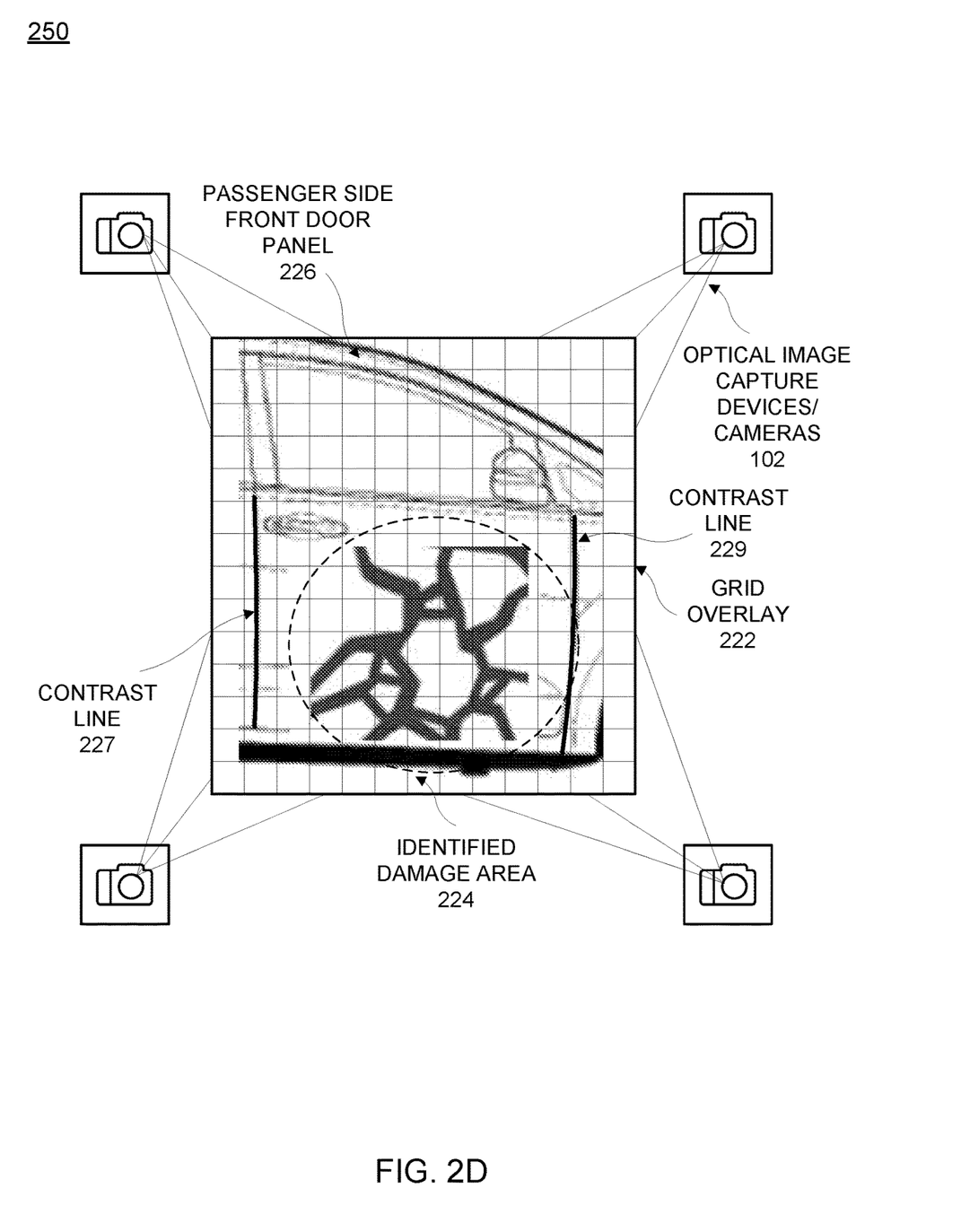
FIG. 2D illustrates a close-up view of a vehicle door being examined for damage with a grid overlay according to example embodiments.

FIG. 2D illustrates a close-up view of a vehicle door being examined for damage with a grid overlay according to example embodiments. Referring to FIG. 2D, the configuration 250 provides a detailed image analysis of how the overlaid grid which is linked to manufacturer data can be used to compare known distances in various locations of a vehicle section (e.g., door, fender, hood, etc.) from left to right, top to bottom, corner to corner, etc., and compare those to distances which are actually identified, measured and/or estimated by the captured image data. For example, in this scenario of FIG. 2D, the front side passenger door 226 may be automatically identified from contrast lines defining its position with respect to neighboring vehicle sections, such as rear door and front fender. Also, the overlay placement 222 may assist with defining the vehicle body section since the distances defined by the vehicle manufacturer door are already defined and placed in a position that is near all sides of the door captured by the image capturing device.

Once the correct positioning and vehicle section are identified, the identified damaged area 224 can be identified based on measurement analysis, which includes multiple comparison operations of the captured image data to the manufacturer data. The contrast image lines 227/229, etc., may be identified from darker portions of the image, which are used as a basis for actual distance (modified by a collision) to expected distances provided by a manufacturer. For example, once the vehicle door is identified from image data, then a plurality of measurements may be conducted from corner to corner of the door, side to side of the door (horizontal and vertical), etc., within the constraints of the contrast lines. Each measurement can be compared to a comparable measurement location of the grid overlay which represents the manufacturer data, such as distances identifying the same or similar locations of the door. A collision resulting in damage to the door will most certainly include modifications to the distances measured before and after the collision, which may be based on distances associated with the contrast lines 227/229. For example, if the vehicle door undergoes a collision, the distance from point 'A' to point 'B' is generally smaller than the same distance prior to the collision. Such a discrepancy can be readily identified when the manufacturer data overlay grid is applied to the measured distances of a vehicle door that was in fact in a collision. In order to reduce false positives, a hysteresis deviation value can be applied, ('X' millimeters required to initiate a valid deviation). Another requirement may be to have multiple cross-section measurements be identified as deviations from image to manufacturer data prior to labeling the vehicle section as damaged. For example, there may be a minimum of two cross-section measurements (distances from point A to B and B to C, etc.) required to be less than a threshold distance different from the manufacturer measurements in order to achieve a valid damage rating on the vehicle section.

Figure 2E:
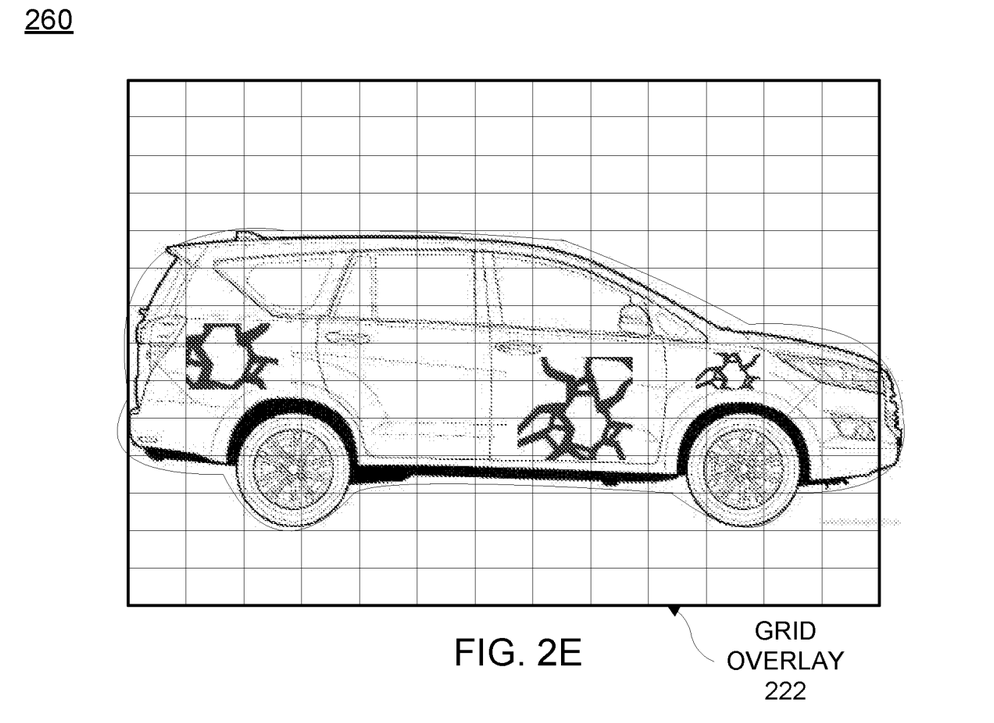
FIG. 2E illustrates a grid overlay view of a vehicle being examined for damage with vehicle overlay data and the grid overlay according to example embodiments.

FIG. 2E illustrates a grid overlay view of a vehicle being examined for damage with vehicle overlay data and the grid overlay according to example embodiments. Referring to FIG. 2E, the example 260 demonstrates an entire vehicle being analyzed according to a distance and size grid 222 applied to the vehicle based on manufacturer specification data. In this example, each collision affected vehicle section may be readily identified based on distance deviations resulting from image data comparisons to manufacturer data.

Figure 2F:
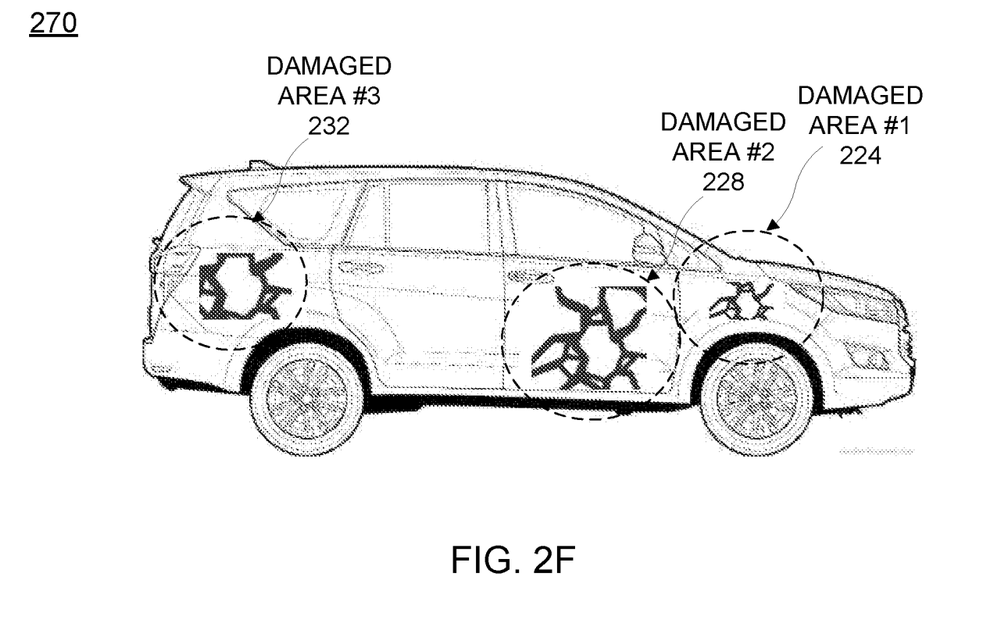
FIG. 2F illustrates a resultant view of a vehicle with damaged areas having been identified according to example embodiments.

FIG. 2F illustrates a resultant view of a vehicle with damaged areas having been identified according to example embodiments. Referring to FIG. 2F, the rendition 270 may be an automatically generated display for a user interface which provides summarized, focused and selected portions of the vehicle where the collision affected the vehicle body.

In this example, there are three damage areas 228, 224 and 232 identified as being different vehicle sections for replacement or repair (e.g., paint, buffer, replace, etc.). The size of the identification areas 1-3 may be based on a range of deviation data. For example, if the cross-sectional areas measured (millimeter/inch/centimeter, etc.) demonstrate comparison measurement deviations which begin and end in certain areas, such as identified contrast lines of an image, then the damaged areas can be focal points which are highlighted via damage circles which are automatically enlarged to a size that coincides with the identified damaged areas. This labeling procedure may offer a user an opportunity to confirm the damages one at a time when the report is generated.

According to another example embodiment, images captured may include the top and bottom of the vehicle. In this example, the bottom of the vehicle may be photographed to capture vehicle damages to the control arms, sway bar, sub-frame and/or exhaust system that runs through the body of the vehicle. The overlay data may be superimposed or overlaid onto the vehicle undercarriage and manufacturer data may be identified from the database and compared to the distances between any one or more of the above components for distance differences which exceed the deviation margin thresholds resulting in a designation of 'damage' to the vehicle. The positions of the exhaust system, control arms, sway bar, etc., may all be necessary fundamentals which dictate whether damage has occurred when deviations in the distances between those elements are identified.

Figure 2G:
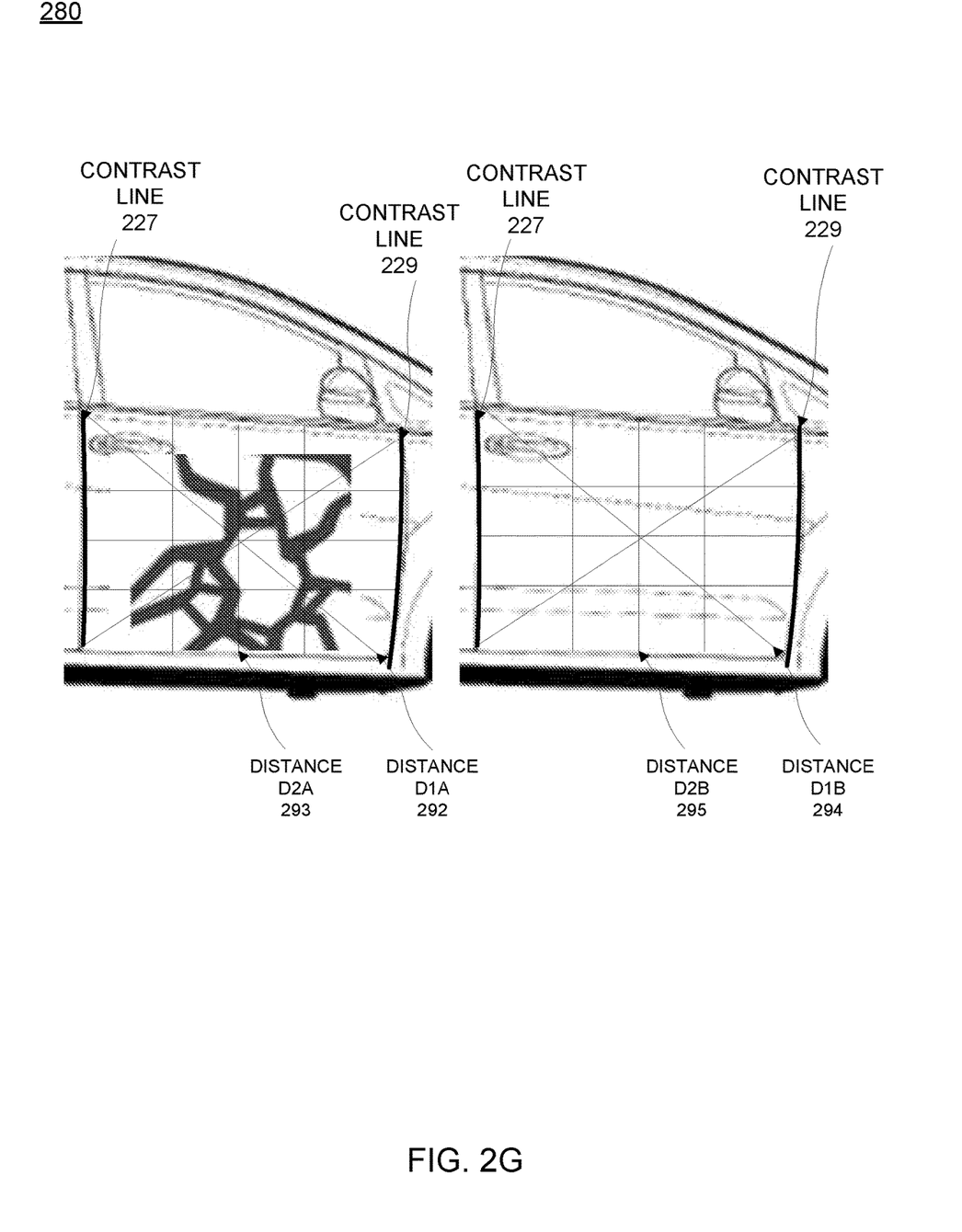
FIG. 2G illustrates a close-up view of a vehicle door being processed for damage with a grid overlay and various distance vectors according to example embodiments.

FIG. 2G illustrates a close-up view of a vehicle door being processed for damage with a grid overlay and various distance vectors according to example embodiments. Referring to FIG. 2G, the illustration 280 demonstrates how the distance measurements D1A 292 of a cross-sectional distance identified from the image data along with distance D2A 293 of the image data, and D1B 294 and D2B 295 of the manufacturer data are taken for comparison purposes. The cross-sectional distance D1A 292 of the image is identified from the overlay comparison grid, however, the overlay grid is based on known manufacturer dimensions, and thus when the grid information is compared to the vehicle image data or 'actual' vehicle data, the distances will be inconsistent or different and if the difference between the measurements is beyond a threshold amount, such as 3%, 4%, 5%, etc., then the area adjacent to the measured distance may be deemed 'damaged' and the grid blocks which are contiguous to that particular distance line may be deemed damaged, however, damage may require at least one additional deviation line be identified that intersects the identified deviation line prior to deeming a particular block in the grid as damaged. For example, the damage designation may require two lines of inconsistent lengths.

One example process of operation may include receiving captured data identifying a vehicle body, such as image data and comparing the captured data to vehicle overlay data for difference data, such as distance differences. The process may also include determining whether the difference data identified is beyond one or more difference thresholds, and designating one or more vehicle portions as damaged when the difference data identified is beyond the threshold. In general, damaged vehicle body parts will be identified when the difference data is a measured distance(s) which exceeds a threshold value to avoid false positives.

In addition to image data, the captured data may include one or more of optical image data and video data. The process may also include separating the captured data into a plurality of data sub-sets identifying the respective vehicle portions, the data sub-sets are identified based on contrast lines as separation points between body parts, vehicles do not have continuous bodies and the contrast lines are used by the image processing configuration of the processor and computing device as a point where the vehicle body part ends and another begins. The overlay can also assist with defining body parts of the vehicle since the overlay data is defined by part and not only by the vehicle as a whole. Once the lines are identified specification data may be retrieved for identifying a specification size of each of the respective vehicle portions based on the vehicle overlay data. The process may also include comparing each of the plurality of data sub-sets to the corresponding respective vehicle portions identified from the specification data to obtain the difference data, and comparing each of a plurality of subsets of the difference data to the one or more difference thresholds. Each distance identified in each data subset, from a contrast line of image data to an endpoint defined in the overlay data represents a difference value. In other words, the image data uses the contrast lines as beginning and/or endpoints of the vehicle and the overlay specification data is positioned and compared against the same portion of the vehicle as a basis for how long the vehicle part should be as opposed to how long it actually is at that point of the vehicle. Each distance includes may include a plurality of distances which are identified for each data subset and the endpoint defined in the overlay data may be a plurality of endpoints. For example, there may be a need to perform two measurements at a minimum and confirm two deviations/differences beyond the threshold values in order to deem that part of the vehicle as damaged. The designating the one or more vehicle portions as damaged may include identifying a first vehicle portion as damaged when two or more distances as measured from corresponding contrast lines of the image data for that particular vehicle portion are shorter than the overlay data by the one or more difference thresholds. Most damage does not cause a vehicle body part to increase in length as the damage is pushed into the vehicle body cavity not out of the vehicle body cavity, however, deviations which are longer may also be considered when determining whether damage has occurred.

Figure 2H:
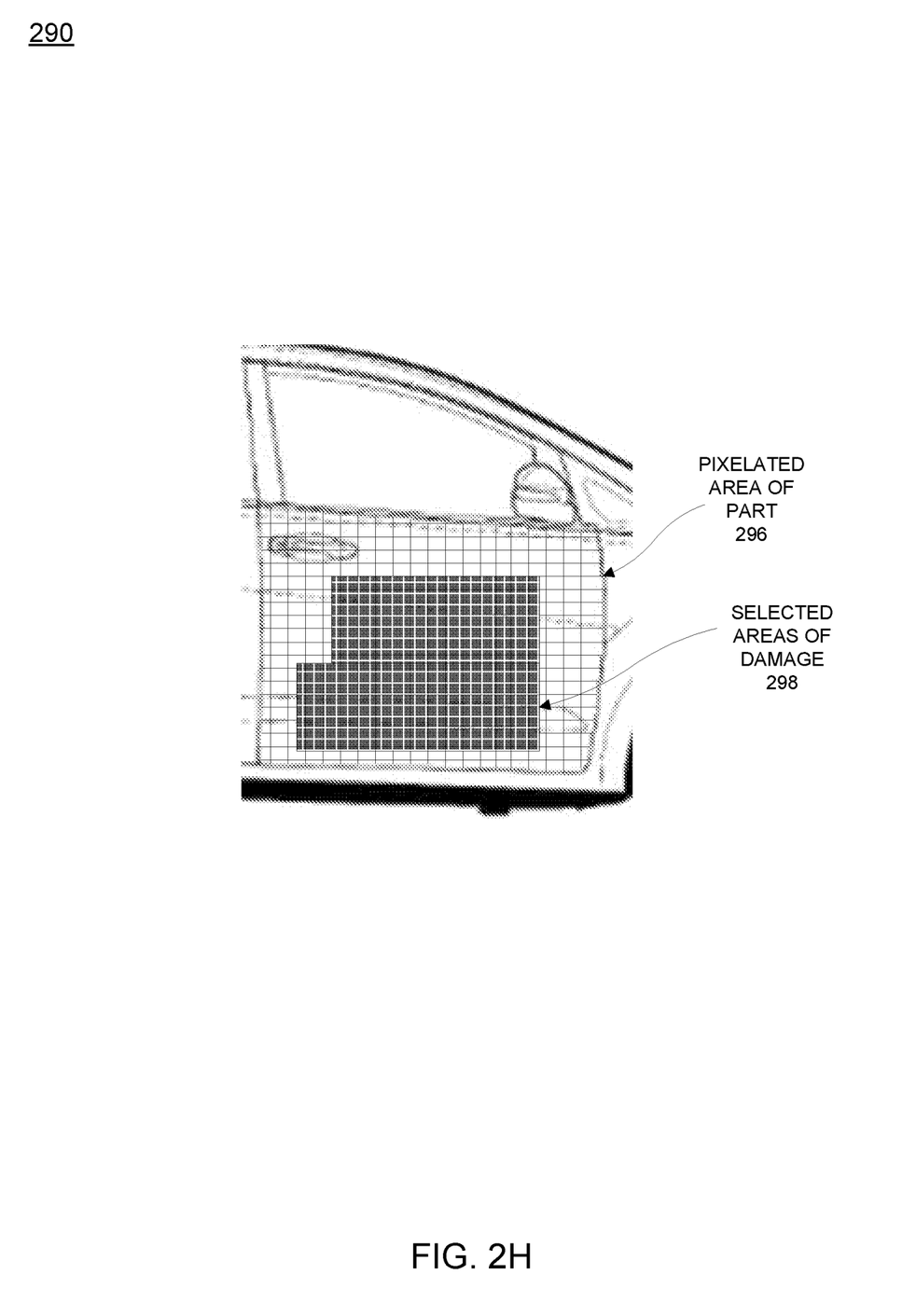
FIG. 2H illustrates a close-up view of a vehicle door being pixelated to demonstrate a coverage area of the damage according to example embodiments.

FIG. 2H illustrates an example 290 where the body part is a door and all the damage has been replaced with a digital pixilation rendition to determine a surface area of the damage. The surface area approach may be used as a comprehensive tool to determine an overall percentage of the vehicle body damage and as a tool to consider a degree of damage. The pixelated area 296 may be the entire area of the body part and the selected pixelated area 298 may be the area of damage detected.

Figure 3A:
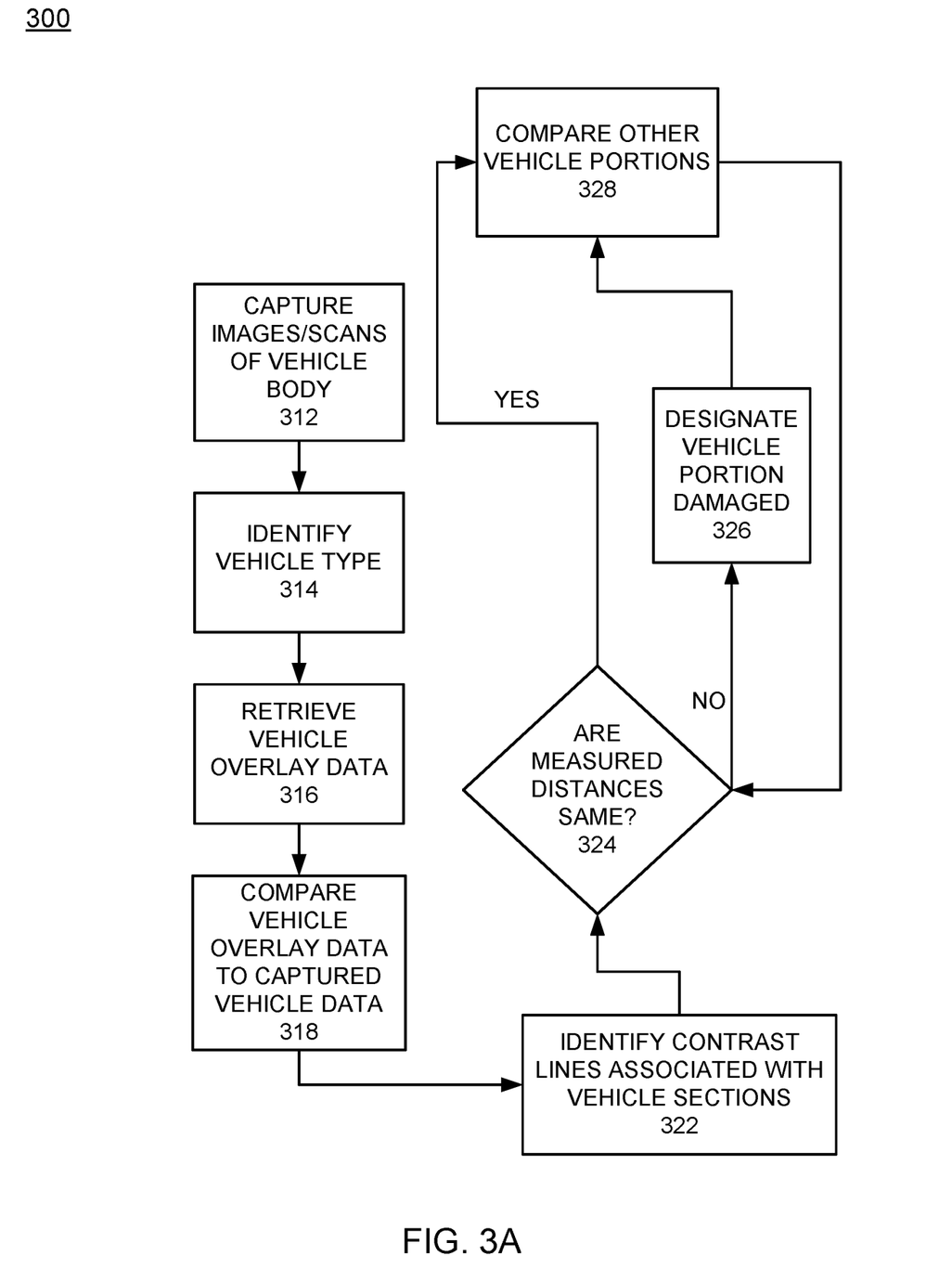
FIG. 3A illustrates an example flow diagram of a process of capturing vehicle images and processing the image data based on specifications to identify vehicle damage according to example embodiments.

FIG. 3A illustrates an example flow diagram of a process of capturing vehicle images and processing the image data based on specifications to identify vehicle damage according to example embodiments. Referring to FIG. 3A, the example flow diagram 300 includes an example of capturing vehicle data and identifying potential damage. The process may include capturing images/scans of a vehicle body 312, identifying a vehicle type 314 or comparable vehicle type based on a length, width, and/or depth of the vehicle. Retrieving a vehicle overlay data 316 from memory to compare the vehicle overlay data to the captured vehicle data 318. Any contrasting lines/distances are identified 322 for each vehicle section and for multiple line distances for a vehicle section. When the measured distances are similar or close within a threshold variation 324 then other portions of the vehicle may be compared 328 and the process continues. Otherwise, the particular vehicle portion will be deemed damaged 326.

In identifying total vehicle damage, false positives must be identified and removed from vehicle damage summary. Some examples may include build-up of dirt or debris which is not indicative of damage but will cause vector distance discrepancies from contrast lines of an identified car body part. One way to eliminate false positives is to use records from previous iterations of the damage system application. For example, each time a specific make and model are identified in the application by images and other data, the system application will be able to denote that a previous vehicle with dirt on a particular vehicle portion produced an abnormally large vector distance across a car door or fender or other car portion being examined by the scanning function. Once the system logs such anomalies as "dirt" build-up or snow and ice buildup, then the next iteration of that same make and model could automatically yield a dirt designation which is ignored as damage, since damages are more consistent with smaller vector distances due to an impact causing an implosion as opposed to an exploded surface area. Some degree of threshold tolerance is necessary to eliminate false positives, however, a certain distance which measures beyond a particular threshold, such as "X" millimeters may trigger a false positive and categorize the false positive according to the known conditions stored from previous iterations on the same make and model profiles of previously logged vehicles. Other variables may be considered when identifying false positives, such as demographics. For instance, in areas in the south during the summer, the trucks which are identified by their VIN data, may be likely to have mud on their vehicle bodies which creates a higher degree of likelihood that the system application will produce a result that indicates no damages due to excessive dirt and debris build-up on vehicle body. Another example may be the desert areas where sand is likely to form a layer of dust on the vehicle. In those parts of the country or world, the system application may have many instances of vehicles with sand build-up which demonstrates a false positive condition of skewed vector distances but which are not actual damage and thus should be dismissed.

Figure 3B:
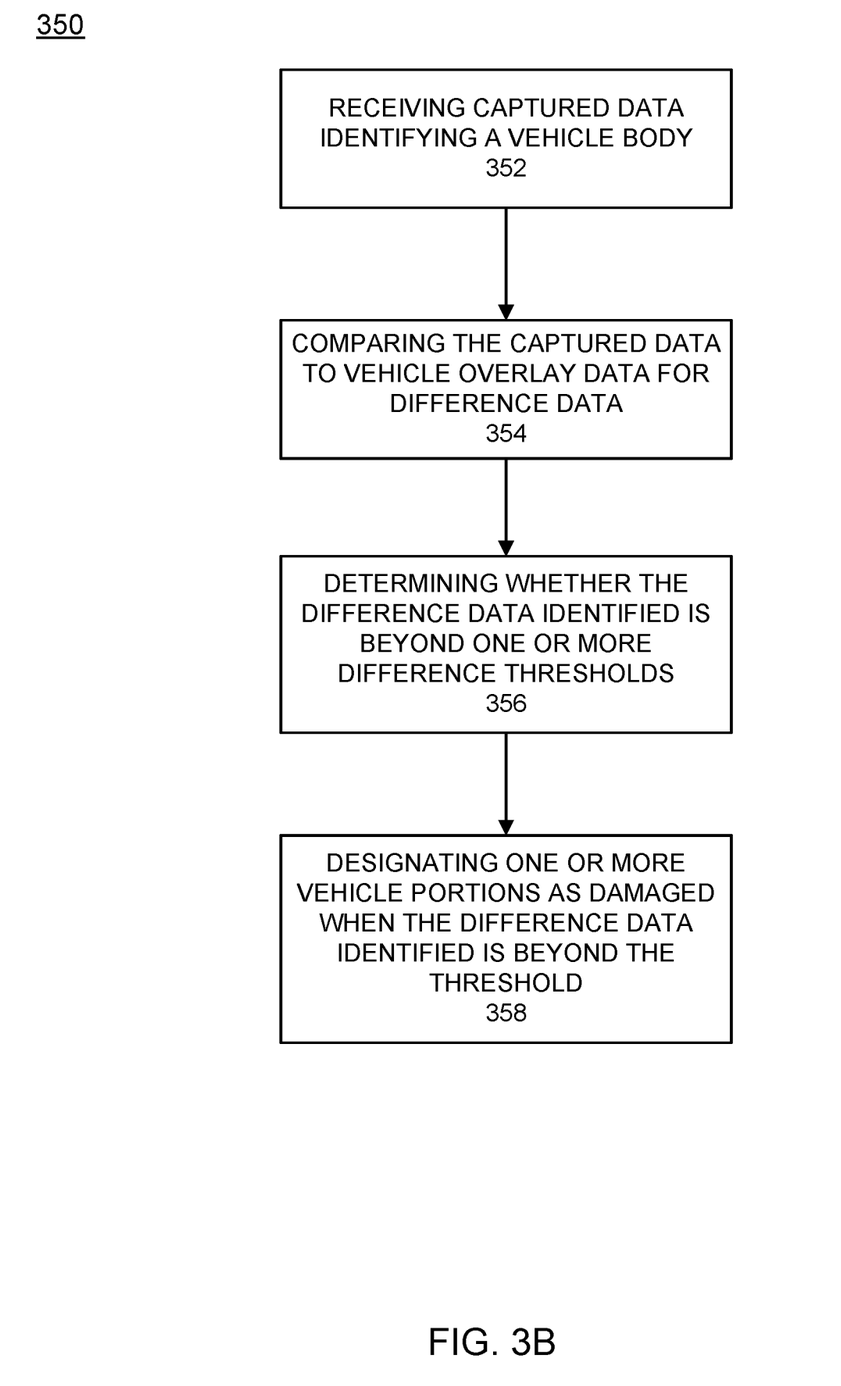
FIG. 3B illustrates another example flow diagram of an example process according to example embodiments.

FIG. 3B illustrates an example process 350 of identifying vehicle body damage according to example embodiments. The process may include receiving captured data identifying a vehicle body 352, comparing the captured data to vehicle overlay data for difference data 354, determining whether the difference data identified is beyond one or more difference thresholds 356 and designating one or more vehicle portions as damaged when the difference data identified is beyond the threshold 358.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent any of the above-described network components of the other figures.

Figure 4:
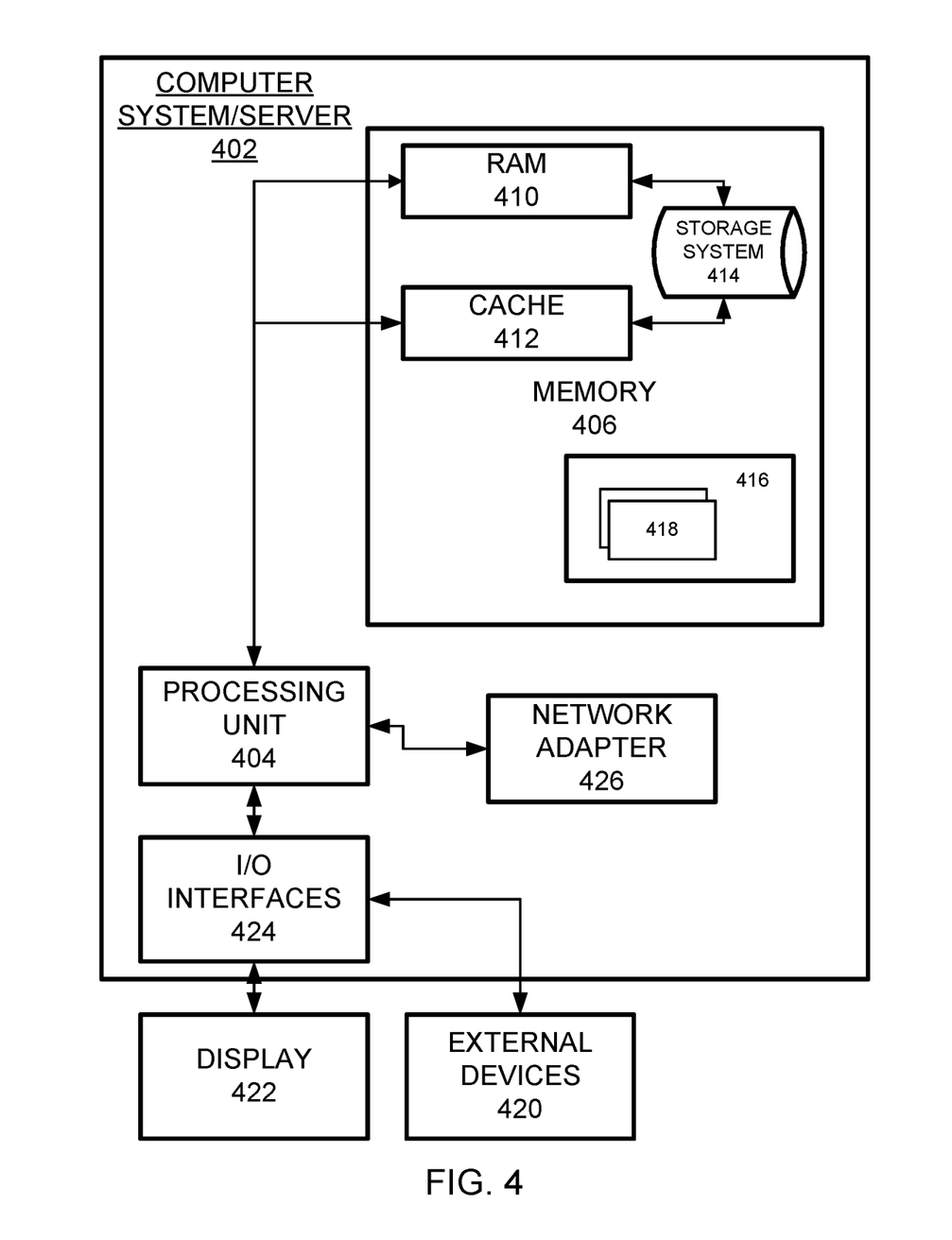
FIG. 4 illustrates an example network entity device configured to store instructions, software, and corresponding hardware for executing the same, according to example embodiments of the present application.

FIG. 4 is not intended to suggest any limitation as to the scope of use or functionality of embodiments of the application described herein. Regardless, the computing node 400 is capable of being implemented and/or performing any of the functionality set forth hereinabove.

In computing node 400 there is a computer system/server 402, which is operational with numerous other general purpose or special purpose computing system environments or configurations. Examples of well-known computing systems, environments, and/or configurations that may be suitable for use with computer system/server 402 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 402 in cloud computing node 400 is shown in the form of a general-purpose computing device. The components of computer system/server 402 may include, but are not limited to, one or more processors or processing units 404, a system memory 406, and a bus that couples various system components including system memory 406 to processor 404.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media. System memory 406, in one embodiment, implements the flow diagrams of the other figures. The system memory 406 can include computer system readable media in the form of volatile memory, such as random-access memory (RAM) 410 and/or cache memory 412. Computer system/server 402 may further include other removable/non-removable, volatile/non-volatile computer system storage media. By way of example only, storage system 414 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 406 may include at least one program product having a set (e.g., at least one) of program modules that are configured to carry out the functions of various embodiments of the application.

Program/utility 416, having a set (at least one) of program modules 418, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. Program modules 418 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 402 may also communicate with one or more external devices 420 such as a keyboard, a pointing device, a display 422, etc.; one or more devices that enable a user to interact with computer system/server 402; and/or any devices (e.g., network card, modem, etc.) that enable computer system/server 402 to communicate with one or more other computing devices. Such communication can occur via I/O interfaces 424. Still yet, computer system/server 402 can communicate with one or more networks such as a local area network (LAN), a general wide area network (WAN), and/or a public network (e.g., the Internet) via network adapter 426. As depicted, network adapter 426 communicates with the other components of computer system/server 402 via a bus. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
    receiving captured data identifying a vehicle body of a vehicle comprising a plurality of vehicle portions;
    comparing the captured data to vehicle overlay data to identify difference data comprising a difference between one or more distances provided by the vehicle overlay data associated with known manufacturer data of the vehicle to one or more distances identified from the captured data of vehicle body;
    determining whether the difference data identified is beyond one or more difference thresholds for one or more of the plurality of vehicle portions based on a difference of the one or more distances of the vehicle overlay data to the one or more distances of the captured data indicating the captured data comprises one or more shorter distances measured across the one or more vehicle portions as compared to the one or distances measured across the one or more vehicles portions of the overlay data and wherein the shorter distances are shorter beyond the one or more difference thresholds; and
    designating the one or more vehicle portions as damaged when the difference data identified is beyond the one or more difference thresholds.

2. The method of claim 1, wherein the captured data comprises one or more of image data, optical image data, and video data.

3. The method of claim 1, comprising
    separating the captured data into a plurality of data sub-sets identifying the respective vehicle portions, wherein the data sub-sets are identified based on contrast lines;
    retrieving specification data identifying a specification size of each of the respective vehicle portions based on the vehicle overlay data;
    comparing each of the plurality of data sub-sets to the corresponding respective vehicle portions identified from the specification data to obtain the difference data; and
    comparing each of a plurality of subsets of the difference data to the one or more difference thresholds.

4. The method of claim 3, wherein each of the one or more distances identified in each data subset, from a contrast line of image data to an endpoint defined in the overlay data, represents a difference value.

5. The method of claim 4, wherein each of the one or more distances are identified for each data subset and the endpoint defined in the overlay data comprises a plurality of endpoints.

6. The method of claim 5, wherein the designating the one or more vehicle portions as damaged comprises identifying a first vehicle portion as damaged when two or more distances as measured from corresponding contrast lines of the image data for that particular vehicle portion are shorter than the overlay data by the one or more difference thresholds.

7. An apparatus comprising:
    a receiver configured to receive captured data identifying a vehicle body of a vehicle comprising a plurality of vehicle portions; and
    a processor configured to
    compare the captured data to vehicle overlay data for to identify difference data comprising a difference between one or more distances provided by the vehicle overlay data associated with known manufacturer data of the vehicle to one or more distances identified from the captured data of vehicle body;
    determine whether the difference data identified is beyond one or more difference thresholds for one or more of the plurality of vehicle portions based on a difference of the one or more distances of the vehicle overlay data to one or more distances of the captured data indicating the captured data comprises one or more shorter distances measured across the one or more vehicle portions as compared to one or distances measured across the one or more vehicles portions of the overlay data and wherein the shorter distances are shorter beyond the one or more difference thresholds; and
    designate the one or more vehicle portions as damaged when the difference data identified is beyond the one or more difference thresholds.

8. The apparatus of claim 7, wherein the captured data comprises one or more of image data, optical image data, and video data.

9. The apparatus of claim 8, wherein the processor is further configured to separate the captured data into a plurality of data sub-sets identifying the respective vehicle portions, wherein the data sub-sets are identified based on contrast lines;
    retrieve specification data identifying a specification size of each of the respective vehicle portions based on the vehicle overlay data;
    compare each of the plurality of data sub-sets to the corresponding respective vehicle portions identified from the specification data to obtain the difference data; and
    compare each of a plurality of subsets of the difference data to the one or more difference thresholds.

10. The apparatus of claim 9, wherein each of the one or more distances identified in each data subset, from a contrast line of image data to an endpoint defined in the overlay data, represents a difference value.

11. The apparatus of claim 10, wherein each of the one or more distances are identified for each data subset and the endpoint defined in the overlay data comprises a plurality of endpoints.

12. The apparatus of claim 11, wherein the designation of the one or more vehicle portions as damaged comprises the processor being further configured to identify a first vehicle portion as damaged when two or more distances as measured from corresponding contrast lines of the image data for that particular vehicle portion are shorter than the overlay data by the one or more difference thresholds.

13. A non-transitory computer readable storage medium configured to store instructions that when executed cause a processor to perform:
receiving captured data identifying a vehicle body of a vehicle comprising a plurality of vehicle portions;
comparing the captured data to vehicle overlay data to identify difference data comprising a difference between one or more distances provided by the vehicle overlay data associated with known manufacturer data of the vehicle to one or more distances identified from the captured data of vehicle body;
determining whether the difference data identified is beyond one or more difference thresholds for one or more of the plurality of vehicle portions based on a difference of the one or more distances of the vehicle overlay data to one or more distances of the captured data indicating the captured data comprises one or more shorter distances measured across the one or more vehicle portions as compared to one or distances measured across the one or more vehicles portions of the overlay data and wherein the shorter distances are shorter beyond the one or more difference thresholds; and
designating the one or more vehicle portions as damaged when the difference data identified is beyond the one or more difference thresholds.

14. The non-transitory computer readable storage medium of claim 13, wherein the captured data comprises one or more of image data, optical image data, and video data.

15. The non-transitory computer readable storage medium of claim 13, comprising
separating the captured data into a plurality of data sub-sets identifying the respective vehicle portions, wherein the data sub-sets are identified based on contrast lines;
retrieving specification data identifying a specification size of each of the respective vehicle portions based on the vehicle overlay data;
comparing each of the plurality of data sub-sets to the corresponding respective vehicle portions identified from the specification data to obtain the difference data; and
comparing each of a plurality of subsets of the difference data to the one or more difference thresholds.

16. The non-transitory computer readable storage medium of claim 15, wherein each of the one or more distances identified in each data subset, from a contrast line of image data to an endpoint defined in the overlay data represents, a difference value.

17. The non-transitory computer readable storage medium of claim 16, wherein each of the one or more distances are identified for each data subset and the endpoint defined in the overlay data comprises a plurality of endpoints.

18. The non-transitory computer readable storage medium of claim 17, wherein the designating the one or more vehicle portions as damaged comprises identifying a first vehicle portion as damaged when two or more distances as measured from corresponding contrast lines of the image data for that particular vehicle portion are shorter than the overlay data by the one or more difference thresholds.

* * * * *